United States Patent
Meid et al.

(10) Patent No.: US 11,359,649 B2
(45) Date of Patent: Jun. 14, 2022

(54) HYDRAULIC SYSTEM AND VEHICLE

(71) Applicant: DEERE & COMPANY, Moline, IL (US)

(72) Inventors: Michael Meid, Mannheim (DE); Christian Brueser, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 122 days.

(21) Appl. No.: 16/835,775

(22) Filed: Mar. 31, 2020

(65) Prior Publication Data

US 2020/0324810 A1 Oct. 15, 2020

(30) Foreign Application Priority Data

Apr. 10, 2019 (DE) .......................... 102019205151.0

(51) Int. Cl.
*F15B 20/00* (2006.01)

(52) U.S. Cl.
CPC ... *F15B 20/004* (2013.01); *F15B 2211/20576* (2013.01); *F15B 2211/2658* (2013.01)

(58) Field of Classification Search
CPC ............ F15B 20/004; F15B 2211/2654; F15B 11/17; F15B 11/162; F15B 2211/6653
See application file for complete search history.

(56) References Cited

U.S. PATENT DOCUMENTS

| | | | | |
|---|---|---|---|---|
| 4,422,290 A | * | 12/1983 | Huffman | ................. F15B 11/17 180/403 |
| 8,756,930 B2 | * | 6/2014 | Johnson | ................ E02F 9/2242 60/430 |
| 2013/0312401 A1 | | 11/2013 | Frommelt | |

FOREIGN PATENT DOCUMENTS

| | | |
|---|---|---|
| CN | 105626618 A | 6/2016 |
| DE | 102005052017 A1 | 2/2007 |
| EP | 2042745 A2 | 4/2009 |
| WO | WO2011023028 A1 | 3/2011 |

OTHER PUBLICATIONS

European Search Report issued in counterpart application No. 20167945.3 dated Sep. 28, 2020 (05 pages).

* cited by examiner

*Primary Examiner* — F Daniel Lopez (57) ABSTRACT

A hydraulic system of a vehicle includes a first pump for supplying at least one first hydraulic circuit and at least one second pump for supplying at least one second hydraulic circuit with hydraulic medium. The second pump supplies the first hydraulic circuit with hydraulic medium in an emergency mode or when an output pressure of the first pump fails.

20 Claims, 7 Drawing Sheets

HYDRAULIC SYSTEM AND VEHICLE

RELATED APPLICATIONS

This application claims priority to German Patent Application Ser. No. 102019205151.0, filed Apr. 10, 2019, the disclosure of which is hereby incorporated by reference in its entirety.

FIELD OF THE DISCLOSURE

The present disclosure relates to a hydraulic system of a vehicle having a first pump for supplying at least one first hydraulic circuit and a second pump for supplying at least one second hydraulic circuit with hydraulic medium, and to a vehicle having at least one hydraulic system.

BACKGROUND

Power operation of braking or steering systems on vehicles, especially on agricultural or industrial vehicles, e.g., agricultural tractors, is known. The energy for this power operation is usually made available by a hydraulic system located on board the vehicle. In the event of a failure of the hydraulic system or even of just one pump of the hydraulic system or of a drive of the hydraulic system, there must still be a possibility of braking or steering the vehicle, particularly for reasons of safety.

For this purpose, manual emergency steering/emergency braking stages or additional emergency pumps (in the majority of cases pumps driven electrically or by the wheels of the vehicle) are generally provided on known vehicles. This is laborious and can generate additional costs or increase the complexity of the vehicle system.

SUMMARY

In the present disclosure, a hydraulic system of a vehicle has a first pump for supplying at least one first hydraulic circuit and a second pump for supplying at least one second hydraulic circuit with hydraulic medium, wherein the second pump supplies the first hydraulic circuit with hydraulic medium in the emergency mode or when an output pressure of the first pump collapses. In this way, it is possible to dispense with a separate or additional pump, in particular a pump which has to be kept in reserve for the case of failure of the first pump, since a second pump already provided for other hydraulic functions is used as an optional emergency pump in the emergency mode. Here, the function of the second pump as an emergency pump in the emergency mode can cover several possible faults—or even malfunctions, e.g. the failure of the first pump, but also the failure of a drive for the pump(s). Thus, this second pump can be given an additional function to the existing supply function, e.g. for a hydraulic circuit with one or more (further) hydraulic function(s). Such an embodiment of a hydraulic system can also enable seamless system integration of the emergency function into the overall hydraulic system. Moreover, it is also possible to dispense with specializations that are otherwise often necessary, thereby making it possible to further reduce overall system costs. A hydraulic system of this kind can be designed as a multi-pump system with two pumps; however, it is also conceivable for further/a plurality of pumps to be provided.

If the first hydraulic circuit supplies at least one system-relevant component of the vehicle, in particular a steering or braking device, with hydraulic medium, or the second hydraulic circuit supplies at least one further functional assembly of the vehicle with hydraulic medium, the second pump can ensure emergency operation of these system-relevant components, in particular of the steering or braking device. It is also possible, in particular, for a system-relevant component of the vehicle to be safety-relevant, e.g., such that a failure of such a component could represent an increased accident risk or some other safety risk.

As an alternative or also in addition, provision can be made for the second pump to supply only the first hydraulic circuit with hydraulic medium in the emergency mode. As an alternative, provision can be made for the second hydraulic circuit also to be supplied, at least partially or temporarily, with hydraulic medium by the second pump. In this way, at least partial or temporary continuance of the further hydraulic functions is made possible, possibly with reduced performance.

It is particularly advantageous if at least one of the pumps is designed as a pump with a variable delivery volume. The delivery volume can be controlled in accordance with an applied load pressure, with the result that the delivery volume or delivery capacity of the pump(s) is obtained from the requirements of the consuming unit(s) in the hydraulic circuit(s).

It is advantageous if at least one changeover valve is provided, which is switched in accordance with a pump output pressure. By the changeover valve, it is possible, for example, to establish a hydraulic connection between the second pump and the first hydraulic circuit, in particular in accordance with a pump output pressure of the first pump. However, it is also possible for the hydraulic system to have one or more further changeover valves.

It is conceivable for the second pump to be driven by a main drive. It is possible, for example, for this drive to be a drive of the vehicle or a pump drive, which may also be separate. Provision can be made for the main drive to drive only this second pump, but it drives at least the first pump as well. It is advantageous, however, if the second pump can also be driven by an emergency drive, thus enabling the second pump to supply at least the first hydraulic circuit with hydraulic medium, even in the case of failure of the main drive. The emergency drive can be an additional internal combustion engine or electric motor, for example. However, the emergency drive can also be in the form of a ground drive and can use the kinetic energy of the vehicle, for example.

If the main drive or the emergency drive is assigned a clutch, the main drive or the emergency drive can be connected selectively to the second pump. Here, the clutch can be in the form of a freewheel clutch, for example, which establishes a connection between the main drive or the emergency drive and the second pump in accordance with an input/output speed. However, the clutch can also be embodied as a hydraulically actuated clutch, which is provided in a manner which allows it to be controlled in a suitable manner e.g., hydraulically or electronically.

If the second pump is operatively connected to the main drive and to the emergency drive via a transmission, speed differences between the main drive and the emergency drive can be compensated, or a speed of the emergency drive can be matched to a speed of the main drive.

It is advantageous if a priority valve is provided, which can direct excess hydraulic medium out of the first hydraulic circuit into the second hydraulic circuit in the emergency mode in accordance with a pressure difference between the first hydraulic circuit and the second hydraulic circuit. In this way, it is also possible for hydraulic medium to be directed to the second hydraulic circuit and thus also to supply the consuming unit(s) in the second hydraulic circuit with hydraulic medium in the emergency mode if there is an excess of hydraulic medium or if the second pump can make available a higher delivery volume than is required for the operation of the consuming unit(s) in the first hydraulic circuit. It is thereby possible to enable full operation of the consuming unit(s) in the second hydraulic circuit or operation with reduced performance/restricted functioning or even just maintenance of basic functions.

If at least one above-described hydraulic system is provided on a vehicle, this hydraulic system can ensure operation of the consuming unit in the first hydraulic circuit even in an emergency mode or when the first pump does not make available any pump output pressure or makes available an inadequate pump output pressure. This consuming unit is, in particular, a system-relevant component, in particular a steering or braking device of the vehicle. The vehicle is, in particular, an agricultural or industrial vehicle, such as in the form of an agricultural tractor or tractor. However, it is also possible for the vehicle to be an agricultural harvesting machine, a self-driving sprayer, a construction vehicle, an industrial transportation or towing vehicle or any other vehicle in which at least one first and one second pump are provided for the purpose of supplying consuming units.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the Figure.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
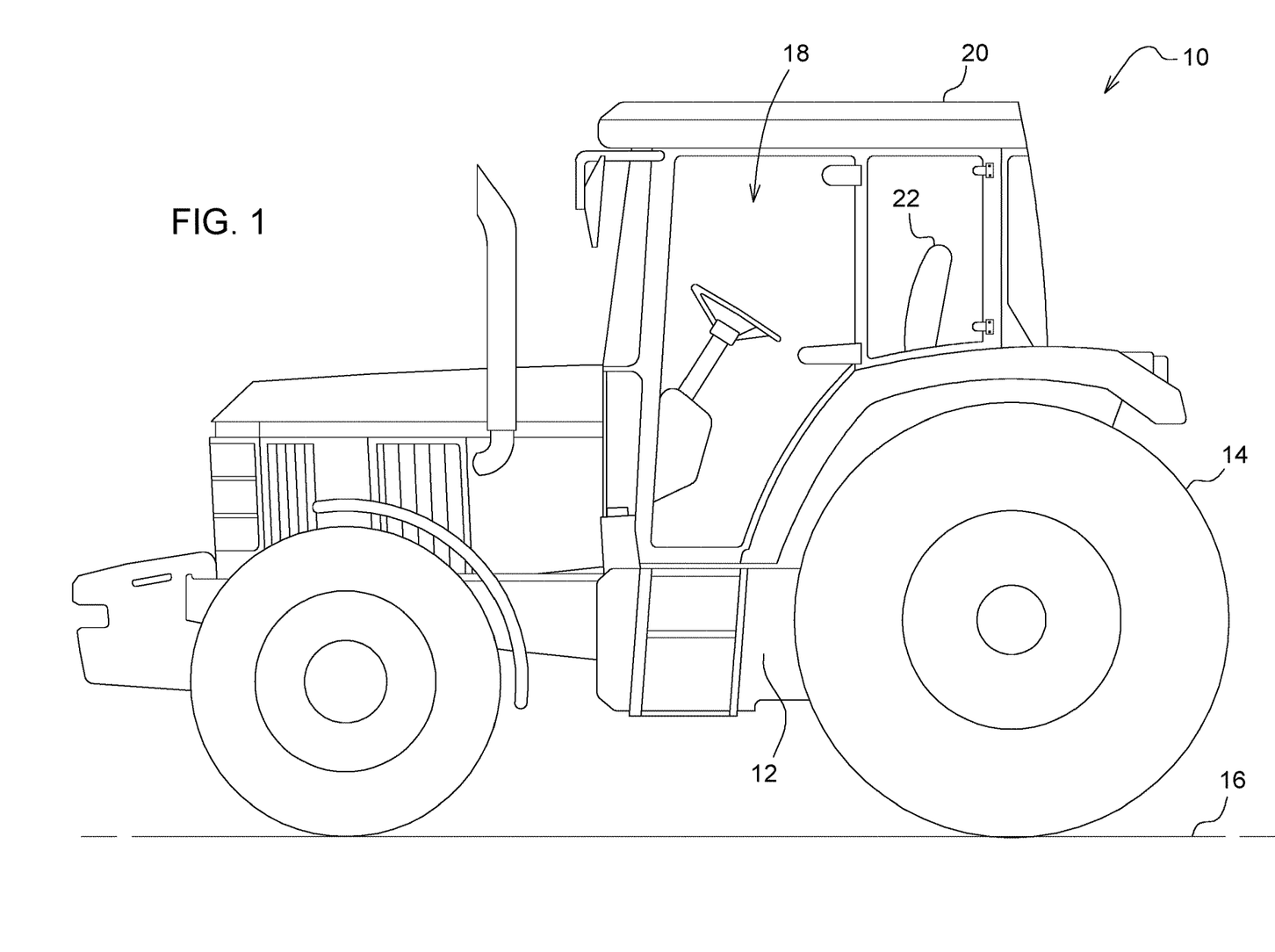
FIG. 1 shows a side view of an agricultural vehicle.

FIG. 1 shows an agricultural vehicle 10 in the form of an agricultural tractor or tractor, having a chassis 12, which is supported on the underlying surface 16 via front and rear wheels 14. An operator workstation 20 is arranged in a cab 18. The vehicle 10 further has a steering and braking system 22 (shown only indicatively in the illustrated embodiment), which is power-operated hydraulically and by which a steering system (not shown) and brakes (not illustrated) of the vehicle 10 can be actuated.

Figure 2:
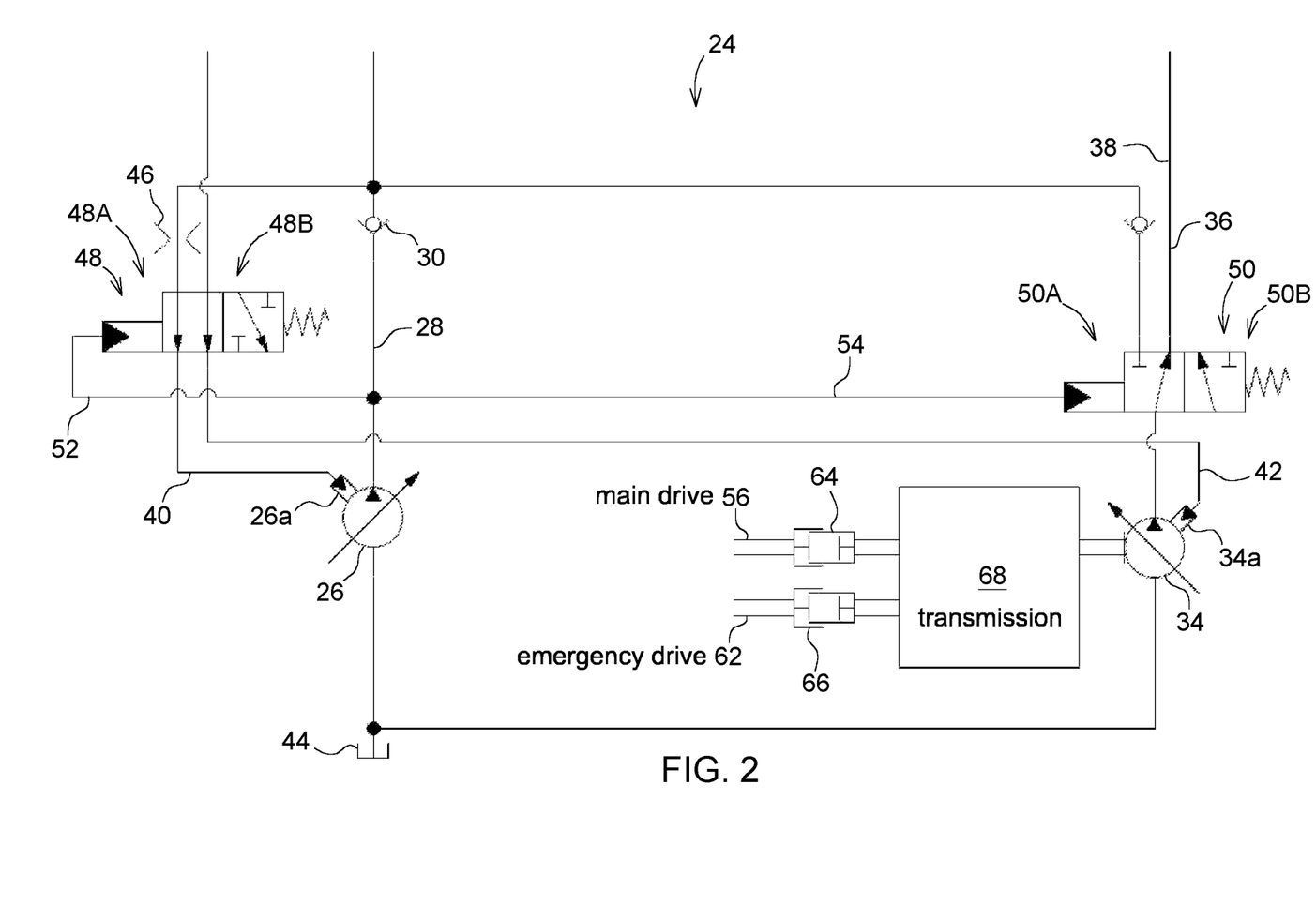
FIG. 2 shows a first embodiment example of a hydraulic system of the vehicle.

A first embodiment of a hydraulic system 24 of the vehicle 10 will now be explained in greater detail with reference to FIG. 2. The hydraulic system 24 has a main hydraulic pump, which is referred to as the first pump 26. The first pump 26 is connected via a first line 28, in which a first check valve 30 is provided, to a hydraulic circuit 32 supplying the steering and braking system 22 of the vehicle 10 with hydraulic medium.

Also provided is an additional pump, which is referred to below as a second pump 34, which supplies a hydraulic circuit 38 or further functional assemblies of the vehicle 10 with hydraulic medium via a second line 36. Both pumps 26, 34 are designed as pumps with a variable delivery volume, wherein the delivery volume is in each case controlled by a pump controller 26a, 34a in a manner dependent on a load pressure prevailing in the respective control line 40, 42. Both pumps 26, 34 draw hydraulic medium from a hydraulic medium reservoir 44 of the vehicle 10. According to the embodiment under consideration, an optional load-pressure signal orifice 46 is provided in the control line 40 assigned to the first pump 26. Here, the load-pressure orifice 46 is illustrated merely for clarity. Normally, the load-pressure orifice 46 is integrated into the consuming unit, e.g., the steering system or brake. This applies to all the embodiments.

Moreover, a first changeover valve 48 and a second changeover valve 50 are provided, which are in the form of spring-loaded 4/2- and 3/2-way valves which can be switched in a pressure-dependent manner and which can adopt a first position 48A, 50A or a position 48B, 50B, depending on whether there is a pressure prevailing in a respective control line 52, 54 or no pressure.

In the normal mode, both pumps 26, 34 are driven by a main drive 56. The changeover valves 48, 50 are subjected to pressure via the control lines 52, 54 in such a way that they adopt their respective first position 48A, 50A, in which the first pump 26 can supply the hydraulic circuit 32 and thus the steering and braking system 22 with hydraulic medium, and the second pump 34 can supply the hydraulic circuit 38 with hydraulic medium. The delivery volume of the pumps 26, 34 is controlled according to the load pressure prevailing in the control lines 40, 42 in the hydraulic circuits 32, 38. In the normal mode, the load pressure of a control line (at the top right of the valve 48) is passed through the changeover valve 48 to the second pump 34.

If there is then a failure of the first pump 26 in a first emergency operating case, there is no longer any pressure either in the control lines 52, 54 of the changeover valves 48, 50 owing to a pressure drop resulting from the failure of the first pump 26, and the changeover valves 48, 50 adopt their respective spring-loaded position 48B, 50B. The second pump 34 then no longer supplies the hydraulic circuit 38 but instead, via a hydraulic line 60 having a check valve 58, supplies the hydraulic circuit 32 and thus the steering and braking system 22. The check valve 58 is not necessarily required but merely represents an additional safety measure in the event of a fault in the changeover valve 50. The control line 42 of the second pump 34 is connected to the first hydraulic circuit 32, and therefore the delivery volume of the second pump 34 is then controlled in accordance with the load pressure of the first hydraulic circuit 32.

If there is a failure of the main drive 56 in a second emergency operating case, then, here too, there is no longer any pressure in the control lines 42, 54, and the changeover valves 48, 50 adopt their position 48B, 50B, as described above. In this case, however, the second pump 34 can be operated by means of an emergency drive 62 rather than by the main drive 56, it being possible for the emergency drive to be embodied as an electric motor or, alternatively, as a ground drive, for example, as described below.

According to the embodiment under consideration, the main drive 56 and the emergency drive 62 can be connected to the second pump 34 via respective clutches 64, 66 designed as freewheel clutches and via a transmission 68 that is an option depending on the type of emergency drive 62. In the normal mode, the transmission 68 can ensure that the maximum rotational speed of the emergency drive 62 is slightly below the idling speed of the main drive 56. However, this can also be achieved, in the case of an emergency drive 62 designed as an electric motor, for example, by appropriate control of the emergency drive 62. If the main drive 56 then fails, the rotational speed falls below the converted rotational speed of the emergency drive 62. The clutch 64 of the main drive 56 slips, and the emergency drive 62 is operatively connected to the pump 34.

Figure 3:
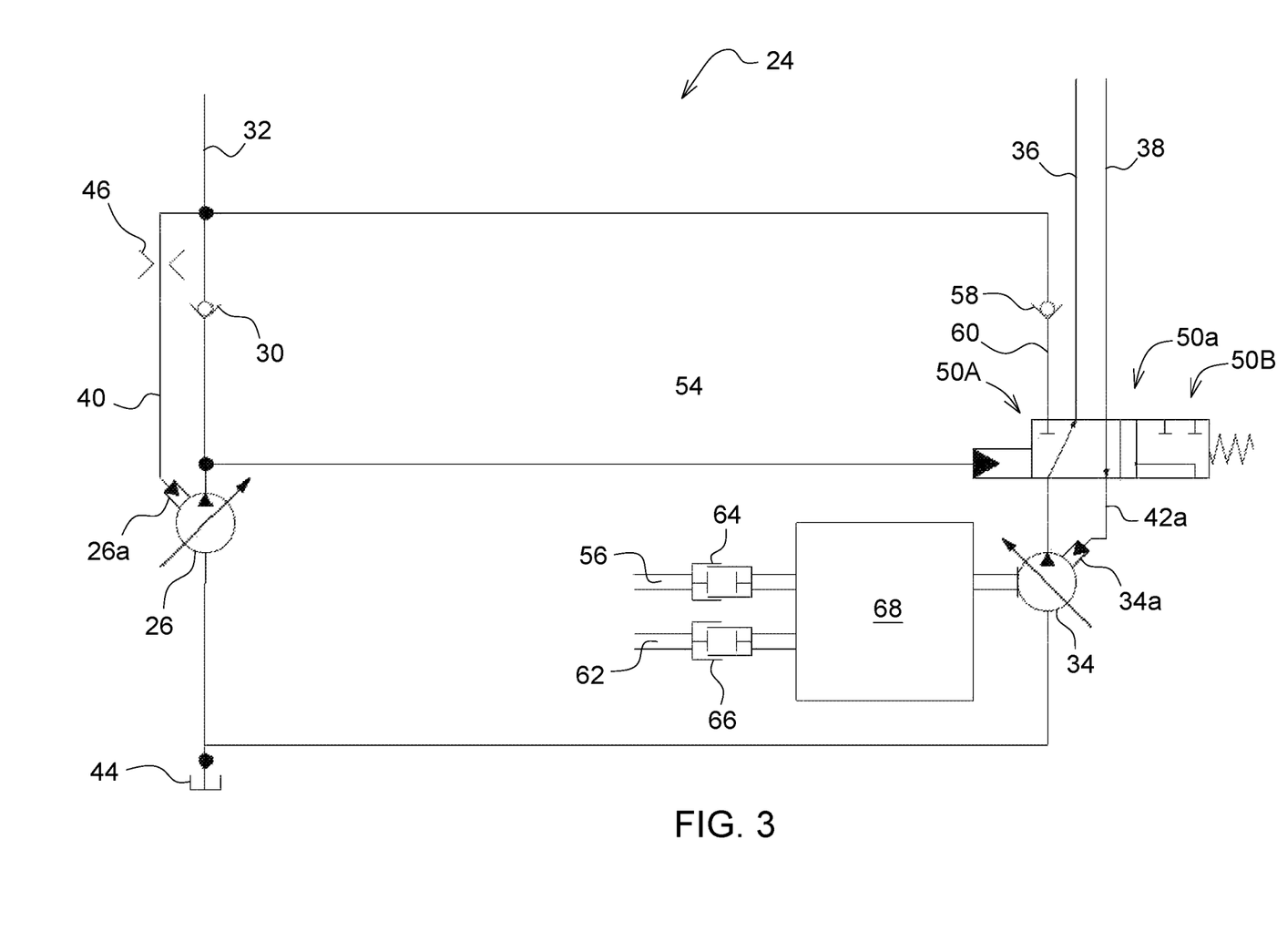
FIG. 3 shows a second embodiment example of the hydraulic system.

Reference is now also made to FIG. 3 of the drawing, in which the reference signs used herein are retained for corresponding components, while similar components are indicated by an appended a. In contrast to the hydraulic system 24 shown in FIG. 2, only one changeover valve 50a is now provided, which is arranged downstream of the second pump 34 and is designed as a 5/2-way valve. As the control pressure, the pump output pressure of the first pump 26 is fed to the changeover valve 50a via a control line 54.

In the normal mode, the first pump 26 supplies the first hydraulic circuit 32 or the steering or braking system 22 with hydraulic medium via a first line 28, in which a first check valve 30 is provided. Here too, a control pressure is made available, via a control line 40, to the pump controller 26a of the first pump 26. The pump output pressure of the first pump 26 is present in the control line 54 of the changeover valve 50a, with the result that the changeover valve 50a adopts a first position 50A, in which the second pump 34 supplies a second hydraulic circuit 38 with hydraulic medium.

If the first pump 26 or the main drive 56 fails, the pressure prevailing in the control line 54 falls, and the changeover valve 50a is moved by spring action into its second position 50B, in which the pump 34 supplies the hydraulic circuit 32 with hydraulic medium via a hydraulic line 60 having a check valve 58. In contrast to the first embodiment example, no load-dependent control of the second pump 34 takes place in the emergency mode in the second embodiment example since the second pump 34 is fed only with its own pump output pressure, via the control line 42a, in the emergency mode. The second hydraulic circuit 38 is no longer supplied with hydraulic medium.

For emergency operation in the case of a failure of the main drive 56, attention is drawn as regards the driving of the second pump 34 to the corresponding description of the first embodiment.

Figure 4:
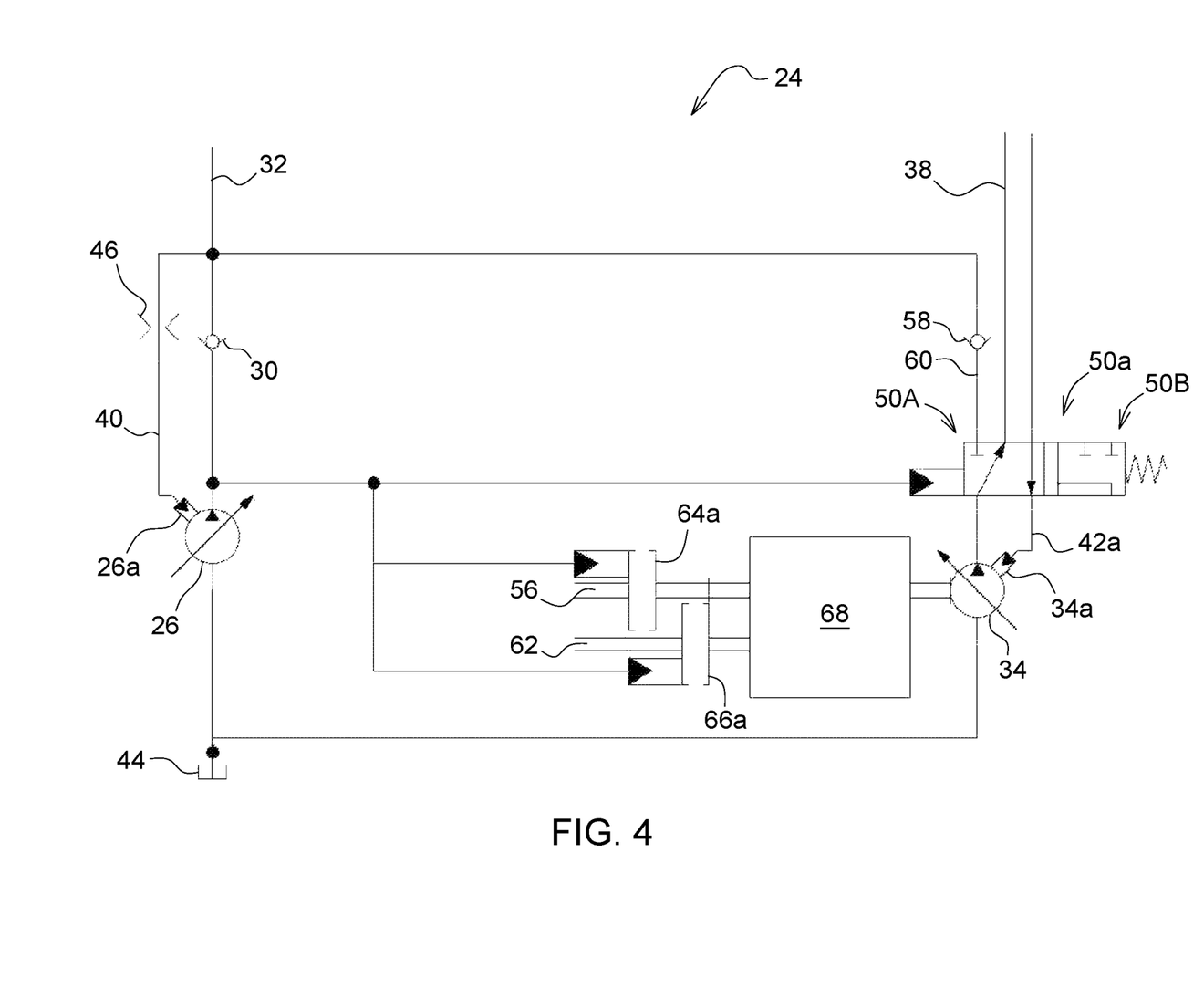
FIG. 4 shows a third embodiment example of a hydraulic system.

Reference is now also made to FIG. 4 of the drawing, in which a third embodiment is shown, which corresponds in terms of the construction and operation of the hydraulic system 24 as such to the second embodiment.

As a departure from the first and the second embodiments, the main drive 56 and the emergency drive 62 can be connected operatively to the second pump 34 or the optional transmission 68 via hydraulically actuable clutches 64a, 66a, wherein the clutch 64a connecting the main drive 56 closes when the first pump 26 subjects the clutch 64a to pressure via the control line 54, and opens when the pressure in the control line 54 falls or there is no pressure. The second clutch 66a, which connects the emergency drive 62, is open as long as there is a pressure in the control line 54. However, if the first pump 26 or the main drive 56 fails, the pressure in the control line 54 falls, as a result of which the clutch 66a closes and connects the emergency drive 62 operatively to the second pump 34 directly or via the transmission 68.

Figure 5:
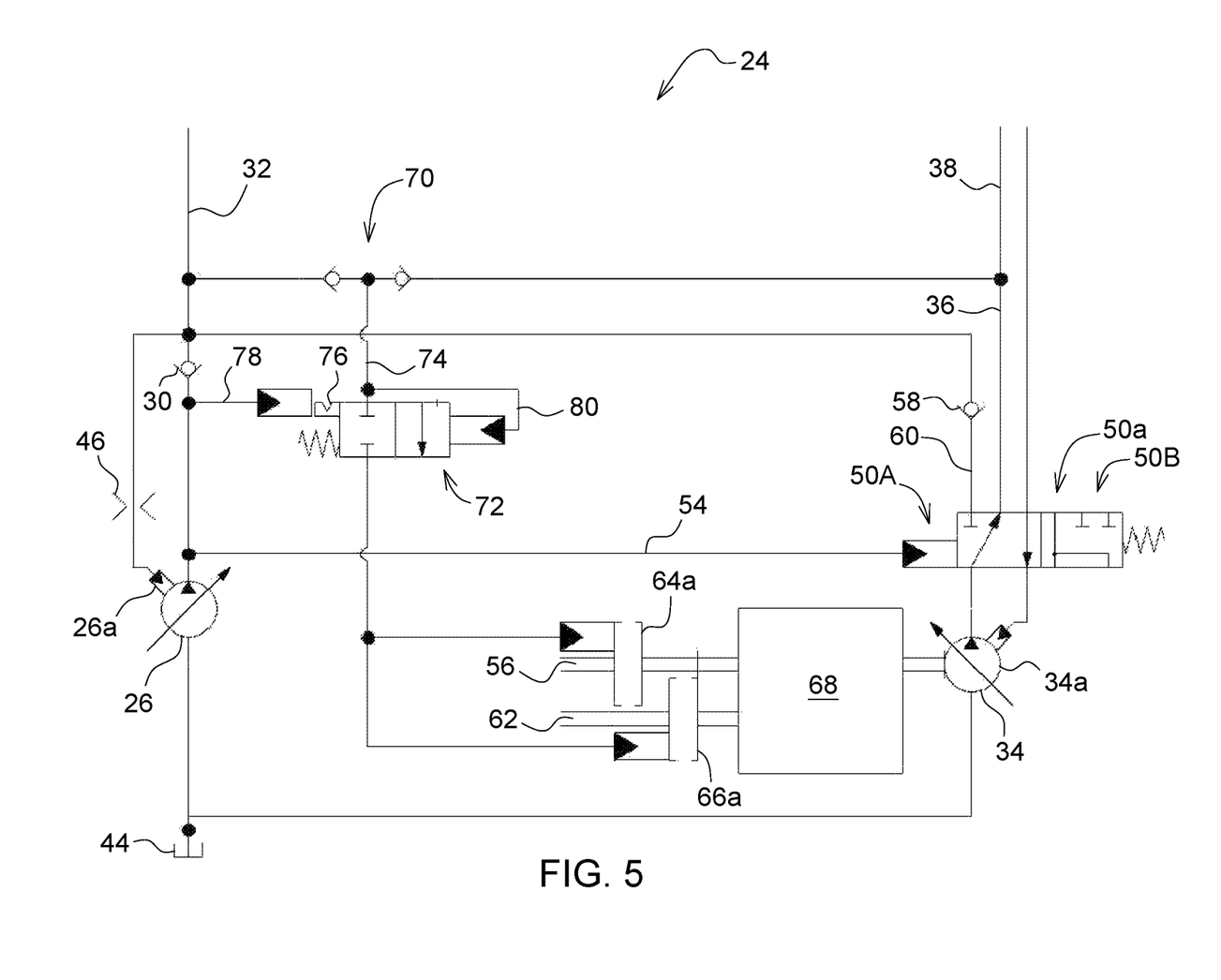
FIG. 5 shows a fourth embodiment example of a hydraulic system.

With reference to FIG. 5, a fourth embodiment is described below, corresponding in fundamental construction to example 2, for which reason corresponding reference signs are used for identical components. Moreover, in the fourth embodiment too, hydraulic clutches 64a, 66a are provided, the action of which corresponds to that of the clutches 64a, 66b of the third embodiment, which are shown in FIG. 4, and which are therefore denoted by the same reference signs.

As a departure from the embodiments shown in FIGS. 3 and 4, a shuttle valve 70 and a clutch valve 72 are now provided. The shuttle valve 70 is provided between the first line 28, which connects the first pump 26 to the first hydraulic circuit 32, and the second line 36, which connects the second pump 34 to the second hydraulic circuit 38. A third line 74 leads from the shuttle valve 70 to the clutch valve 72. The clutch valve 72 is in the form of a valve with a pilot-operated hydraulic detent 76. The hydraulic detent 76 of the clutch valve 72 can be opened by the pump output pressure of the pump 26 via a control line 78, with the result that hydraulic medium is directed to the clutches 64a, 66a from the first pump 26 in the normal mode. The clutch 64a assigned to the main drive 56 is closed by the control pressure passed through the clutch valve 72, while the clutch 66a assigned to the emergency drive 62 is opened.

If no pressure is supplied or (sufficient) pressure is no longer supplied by the first pump 26 in the emergency mode, the second changeover valve 50a switches in such a way that the first hydraulic circuit 32 is supplied with hydraulic medium by the second pump 34 via the line 60 having the second check valve 58. The pump output pressure supplied by the second pump 34 is then applied to the clutch valve 72 via a control line 80. Owing to the continuous control pressure, the hydraulic detent 76 of the clutch valve 72 does not engage in a closed position, and the clutches 64a, 66b remain in their positions corresponding to the normal mode.

If there is a failure of the main drive 56 in the normal mode, neither the first pump 26 nor the second pump 34 (continue to) supply pressure to the hydraulic system, or the pump output pressure of both pumps 26, 34 collapses. Thus, no control pressure is applied to the clutch valve 72 in either of the control lines 78, 80, and therefore the spring-loaded hydraulic detent 76 of the clutch valve 72 engages and divides the connection between the line 74 and the clutches 64a, 66a. The clutch 64a assigned to the main drive 56 opens, and the clutch 66a assigned to the emergency drive 62 closes. The second pump 34 is then operated by means of the emergency drive 62.

After the second pump 34 has started up in the emergency mode, the clutch valve 72 remains in its shutoff position, in which it does not apply pressure to the clutches 64a, 66b since the detent 76 does not reopen owing to the lack of pump output pressure from the first pump 26. This ensures that there is no accidental switch to the main drive 56 due to the pump output pressure of the second pump 34.

Figure 6:
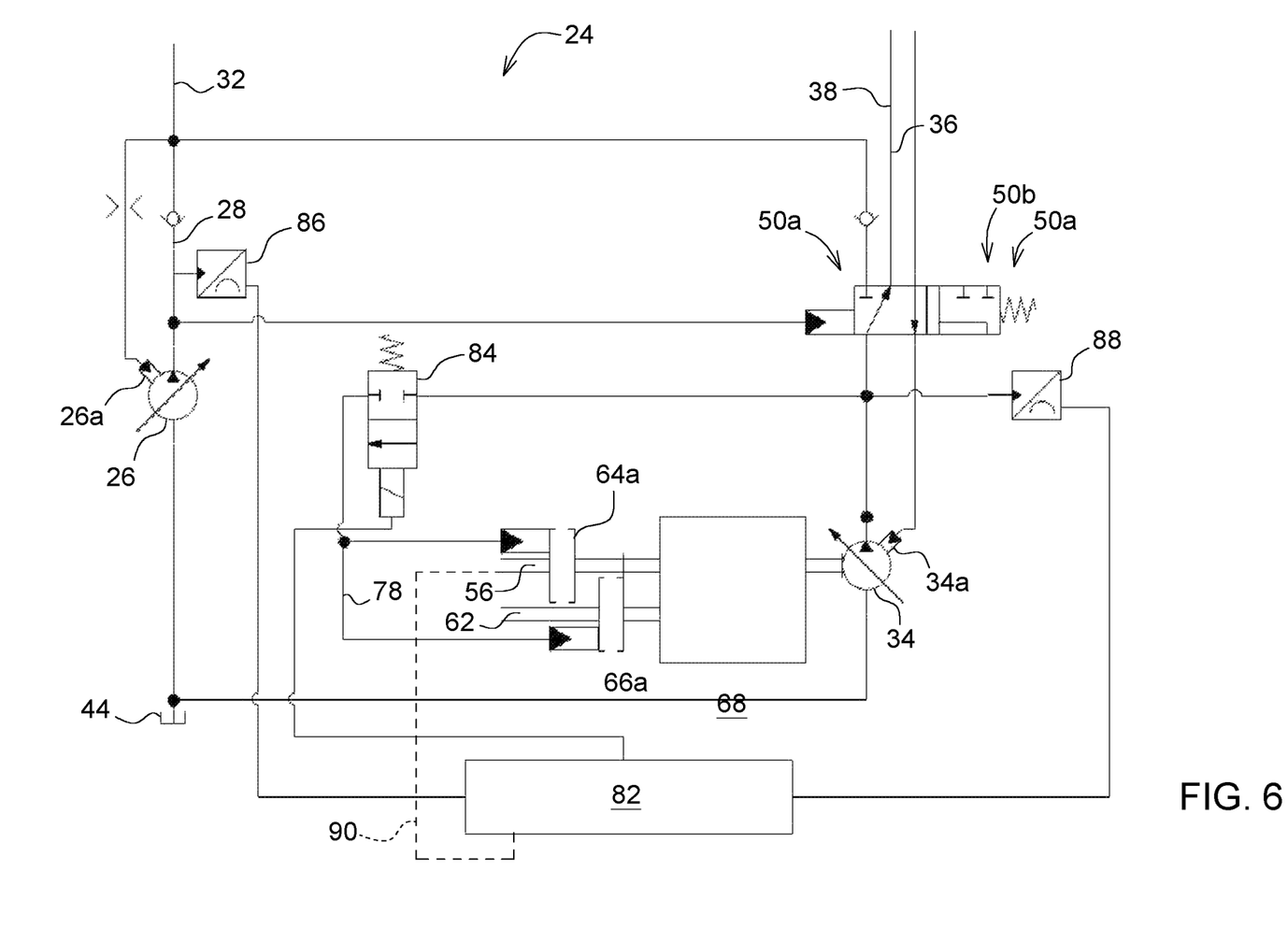
FIG. 6 shows a fifth embodiment example of a hydraulic system.

FIG. 6 then shows a fifth embodiment, which, in terms of its construction, is fundamentally based on the construction of the second embodiment and, as regards the clutches, is based on the third embodiment. Corresponding reference signs are therefore once again used for corresponding components.

In the embodiment shown in FIG. 6, the drive state and optionally a switchover of the clutches 64a, 66a are monitored by an evaluation electronics 82. The evaluation electronics 82 controls the clutches 64a, 66a via a shutoff valve 84 arranged downstream of the second pump 34 and ahead of the changeover valve 50a and preloaded in the direction of its shutoff position. The shutoff valve 84 is in the form of a 2/2-way valve. Arranged in the first line 28, upstream of the first check valve 30, is a first pressure sensor 86 which is operatively connected to the evaluation electronics 82 and which determines whether there is a pump output pressure of the first pump 26 in the line 28. A second pressure sensor 88, which is likewise operatively connected to the evaluation electronics 82, determines whether there is a pump output pressure of the second pump 34 downstream of the second pump 34. The status of the main drive 56 is transmitted to the evaluation electronics 82 via a CAN bus link 90 shown only indicatively.

In the emergency mode, the second pump 34 can be driven by the main drive 56 in the event of a failure of the first pump 26, which is shown by the sensor data of the first pressure sensor 86, if the evaluation electronics 82 has the information via the CAN bus link 90 that the main drive 56 is working owing to the pump output pressure. If the evaluation electronics 82 receives the information that the main drive 56 is not or is no longer working, the evaluation electronics 82 controls the shutoff valve 84 accordingly, with the result that the clutch 64a of the main drive 56 is opened and the clutch 66a of the emergency drive 62 is closed. The second pump 34 is then driven by the emergency drive 62.

Integration of the measurement of the rotational speed of the main drive 56 enables both pumps to be arranged behind the transmission 68 in this variant. In this case, failure of the main drive 56 leads only to a changeover to the emergency drive 62. In the event of a failure of the first pump 26, the changeover is made hydraulically, as already described.

Figure 7:
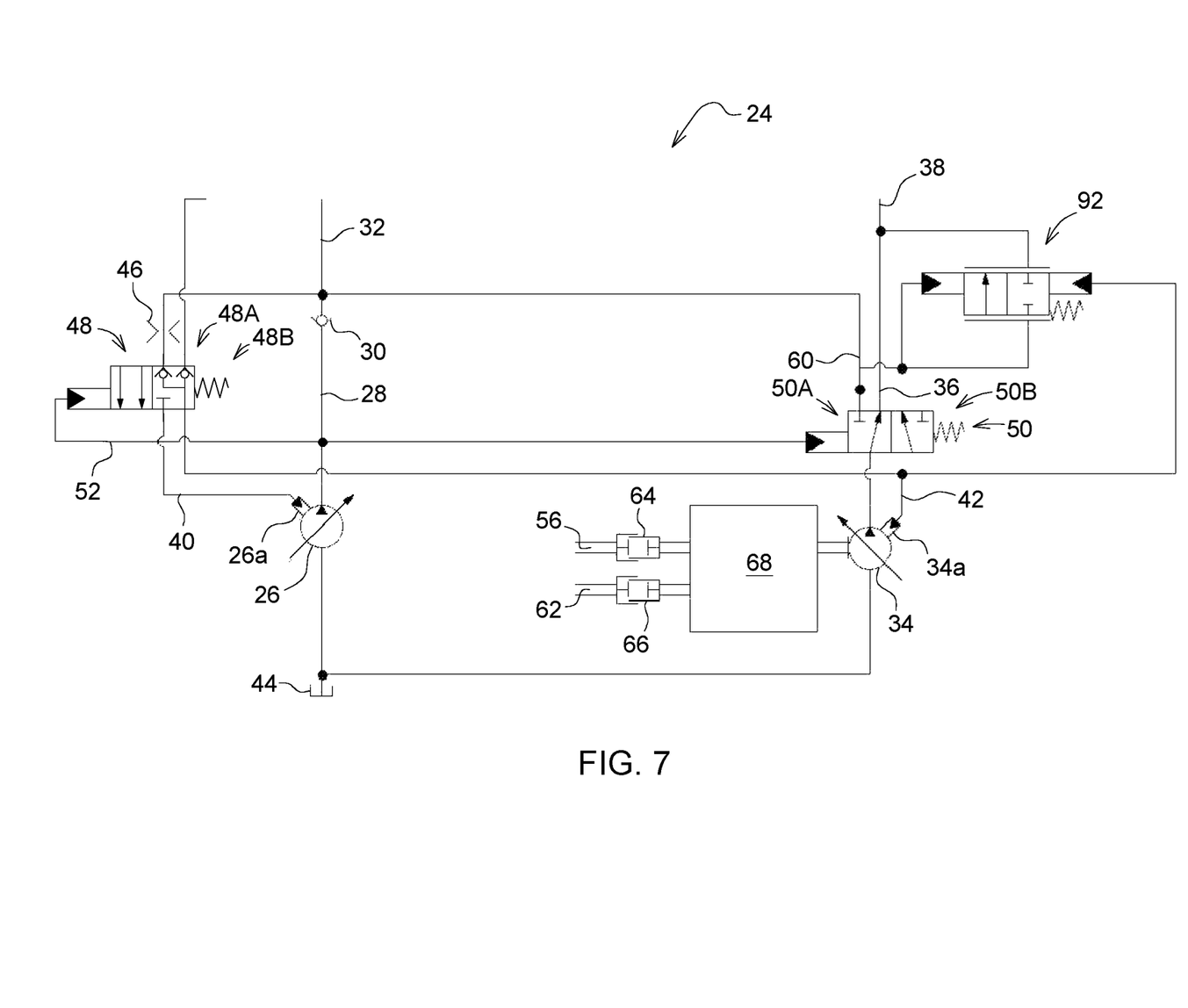
FIG. 7 shows a sixth embodiment example of a hydraulic system.

Reference is now also made to FIG. 7, in which a further embodiment is shown which corresponds fundamentally to the first embodiment. However, this is supplemented by a priority valve 92, which directs excess hydraulic medium out of the first hydraulic circuit 32 into the second hydraulic circuit 38 in the emergency mode, depending on a pressure difference existing between the hydraulic circuits 32 and 38, and thus enables continued supply to the further functional assemblies and of the vehicle 10. In the normal mode, the priority valve 92 is inactive. Moreover, a shuttle valve, which sends the highest load pressure to the second pump 34, is also integrated into the changeover valve 48. The illustration of the priority valve 92 and of the changeover valve 48 in a hydraulic system 24, in accordance with the first embodiment, should be regarded as illustrative. A priority valve 92 of this kind can also be employed in any other of the hydraulic systems 24 of the other embodiments.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic system of a vehicle, comprising:
a first pump for supplying at least one first hydraulic circuit; and
at least one second pump for supplying at least one second hydraulic circuit with hydraulic medium;
wherein the second pump supplies the first hydraulic circuit with hydraulic medium in an emergency mode;
wherein the second pump is driven by a main drive or an emergency drive; and
wherein the second pump is operatively connected to the main drive and to the emergency drive via a transmission.

2. The hydraulic system of claim 1, wherein the first hydraulic circuit supplies a steering or braking system of the vehicle with hydraulic medium.

3. The hydraulic system of claim 1, wherein the second hydraulic circuit supplies at least one functional assembly of the vehicle with hydraulic medium.

4. The hydraulic system of claim 1, wherein the second pump supplies only the first hydraulic circuit or the second hydraulic circuit with hydraulic medium in the emergency mode.

5. The hydraulic system of claim 1, wherein at least one of the pumps is designed as a pump with a variable delivery volume, wherein the delivery volume is controllable in accordance with an applied load pressure.

6. The hydraulic system of claim 1, further comprising at least one changeover valve which is operably switched based on a pump output pressure.

7. The hydraulic system of claim 1, wherein the emergency mode includes one or more of the following: a failure of the first pump, a failure of the main drive, a failure of the output pressure of the first pump, and no pressure in a control line.

8. The hydraulic system of claim 7, wherein the main drive or the emergency drive is assigned a clutch.

9. The hydraulic system of claim 8, wherein the clutch comprises a freewheel clutch or a hydraulic clutch.

10. The hydraulic system of claim 1, wherein the first pump is operatively connected to the main drive and the emergency drive via a transmission.

11. The hydraulic system of claim 1, further comprising a priority valve for directing excess hydraulic medium out of the first hydraulic circuit into the second hydraulic circuit in the emergency mode based on a pressure difference between the first hydraulic circuit and the second hydraulic circuit.

12. The hydraulic system of claim 1, wherein a higher load pressure between the first hydraulic circuit and the second hydraulic circuit is signalled to the second pump by a changeover valve.

13. The hydraulic system of claim 12, wherein the changeover valve comprises an integrated shuttle valve.

14. A vehicle, comprising:
a chassis;
a plurality of wheels for supporting the chassis;
a steering system and a braking system being actuated to control the vehicle;
a hydraulic system comprising:
a first pump for supplying at least one first hydraulic circuit;
a second pump for supplying at least one second hydraulic circuit with hydraulic medium;
wherein the second pump supplies the first hydraulic circuit with hydraulic medium in an emergency mode;

wherein the first hydraulic circuit supplies the steering or braking system of the vehicle with hydraulic medium; and wherein the second pump is operatively connected to the main drive and the emergency drive via a transmission.

15. The vehicle of claim 14, wherein the second pump supplies only the first hydraulic circuit or the second hydraulic circuit with hydraulic medium in the emergency mode.

16. The vehicle of claim 14, further comprising at least one changeover valve which is operably switched based on a pump output pressure.

17. The vehicle of claim 14, wherein the second pump is driven by a main drive or an emergency drive.

18. The vehicle of claim 17, wherein the first pump is operatively connected to the main drive and the emergency drive via a transmission.

19. A hydraulic system of a vehicle, comprising:
a first pump for supplying at least one first hydraulic circuit;
at least one second pump for supplying at least one second hydraulic circuit with hydraulic medium;
a priority valve for directing excess hydraulic medium out of the first hydraulic circuit into the second hydraulic circuit in the emergency mode based on a pressure difference between the first hydraulic circuit and the second hydraulic circuit; and
a changeover valve including an integrated shuttle valve;
wherein the second pump supplies the first hydraulic circuit with hydraulic medium in an emergency mode;
wherein the changeover valve signals a higher load pressure between the first hydraulic circuit and the second hydraulic circuit to the second pump.

20. A hydraulic system of a vehicle, comprising:
a first pump for supplying at least one first hydraulic circuit;
at least one second pump for supplying at least one second hydraulic circuit with hydraulic medium; and
a priority valve for directing excess hydraulic medium out of the first hydraulic circuit into the second hydraulic circuit in the emergency mode based on a pressure difference between the first hydraulic circuit and the second hydraulic circuit;
wherein the second pump supplies the first hydraulic circuit with hydraulic medium in an emergency mode.

* * * * *